United States Patent
Liu et al.

(10) Patent No.: US 10,108,553 B2
(45) Date of Patent: Oct. 23, 2018

(54) MEMORY MANAGEMENT METHOD AND DEVICE AND MEMORY CONTROLLER

(71) Applicant: Huawei Technologies Co., Ltd., Shenzhen (CN)

(72) Inventors: Yao Liu, Beijing (CN); Licheng Chen, Beijing (CN); Zehan Cui, Beijing (CN); Mingyu Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 72 days.

(21) Appl. No.: 15/415,344

(22) Filed: Jan. 25, 2017

(65) Prior Publication Data
US 2017/0132148 A1 May 11, 2017

Related U.S. Application Data

(63) Continuation of application No. PCT/CN2015/084798, filed on Jul. 22, 2015.

(30) Foreign Application Priority Data

Jul. 31, 2014 (CN) .......................... 2014 1 0373858

(51) Int. Cl.
*G06F 12/1009* (2016.01)
*G06F 12/1027* (2016.01)

(52) U.S. Cl.
CPC ...... *G06F 12/1009* (2013.01); *G06F 12/1027* (2013.01); *G06F 2212/68* (2013.01); *G06F 2212/681* (2013.01); *G06F 2212/684* (2013.01)

(58) Field of Classification Search
CPC ............. G06F 12/1009; G06F 12/1027; G06F 2212/68; G06F 2212/681; G06F 2212/684
See application file for complete search history.

(56) References Cited

U.S. PATENT DOCUMENTS

| | | | | |
|---|---|---|---|---|
| 5,388,244 | A * | 2/1995 | Brent | G06F 12/08 711/208 |
| 5,897,664 | A * | 4/1999 | Nesheim | G06F 12/0284 711/147 |
| 6,490,671 | B1 * | 12/2002 | Frank | G06F 12/1027 711/202 |
| 6,760,909 | B1 | 7/2004 | Draves et al. | |
| 2004/0064672 | A1 * | 4/2004 | Fleming | G06F 12/1018 711/207 |
| 2004/0139246 | A1 | 7/2004 | Arimilli et al. | |

(Continued)

FOREIGN PATENT DOCUMENTS

| CN | 101013404 A | 8/2007 |
|---|---|---|
| CN | 101539869 A | 9/2009 |

(Continued)

*Primary Examiner* — Michael Krofcheck
(74) *Attorney, Agent, or Firm* — Slater Matsil, LLP (57) ABSTRACT

A memory management method and device are disclosed. The method includes: managing, by a storage management device, a memory; and when determining that a page table does not include a virtual address carried in a fetch request, managing, by the memory management device, the memory. When determining that the virtual address is valid, the memory management device applies for a blank page. The memory management device is located in a memory controller.

12 Claims, 4 Drawing Sheets

(56) References Cited

U.S. PATENT DOCUMENTS

| | | | |
|---|---|---|---|
| 2005/0005080 A1* | 1/2005 | Dunshea | G06F 12/126 |
| | | | 711/159 |
| 2007/0094445 A1 | 4/2007 | Trika et al. | |
| 2007/0283123 A1 | 12/2007 | Vick et al. | |
| 2009/0300263 A1* | 12/2009 | Devine | G06F 12/1009 |
| | | | 711/6 |
| 2012/0239871 A1 | 9/2012 | Badam et al. | |
| 2012/0297139 A1 | 11/2012 | Choi | |

FOREIGN PATENT DOCUMENTS

| | | |
|---|---|---|
| CN | 102929796 A | 2/2013 |
| JP | 2004220581 A | 8/2004 |
| KR | 19980072720 A | 11/1998 |
| KR | 20120129695 A | 11/2012 |

\* cited by examiner

MEMORY MANAGEMENT METHOD AND DEVICE AND MEMORY CONTROLLER

CROSS-REFERENCE TO RELATED APPLICATIONS

This application is a continuation of International Application No. PCT/CN2015/084798, filed on Jul. 22, 2015, which claims priority to Chinese Patent Application No. 201410373858.2, filed on Jul. 31, 2014. The disclosures of the aforementioned applications are hereby incorporated by reference in their entireties.

TECHNICAL FIELD

The present invention relates to the field of computers, and in particular, to a memory management method and device, and a memory controller.

BACKGROUND

In a computer system, a memory controller is mainly responsible for data exchanges between a CPU and a memory, and physical address management of the memory is implemented by an operating system. The operating system allocates a virtual address to a process. If a translation look-aside buffer (TLB) does not cache the virtual address, and a memory management unit (MMU) does not find a page table entry of the virtual address, a page fault occurs and the CPU is trapped in the kernel of the operating system. When the page fault occurs, the operating system enters an interrupt service routine, performs site protection, pushes various status information of a current instruction such as a program counter onto a stack, and checks validity of the virtual address. If determining that the access is invalid, the operating system usually feeds back a signal to the process or directly kills the process.

In the prior art, if the MMU does not find the page table entry of the virtual address, the MMU directly triggers a page fault, and causes the CPU to be trapped in the kernel of the operating system for a long time. When the page fault occurs, the operating system needs to perform a series of processing, which increases load on the operating system, and management efficiency is relatively low.

SUMMARY

Embodiments of the present invention provide a memory management method and device, and a memory controller, to improve memory management efficiency.

According to a first aspect, embodiments of the present invention provide a memory management method, where the method is applied to a memory management device, and the memory management device is located in a memory controller. The method includes receiving a fetch request sent by a processor, where the fetch request carries a virtual address. The method also includes finding whether a translation look-aside buffer TLB caches a page table corresponding to the virtual address carried in the fetch request; and if yes, obtaining a physical address corresponding to the virtual address from the page table; or if not, obtaining a base address field of the page table and searching for the page table, and if the page table includes the virtual address carried in the fetch request, obtaining a physical address corresponding to the virtual address, where the page table includes a correspondence between virtual addresses and physical addresses, and the TLB is located in the memory management device; and if the page table does not include the virtual address carried in the fetch request, determining whether the virtual address is valid, and applying for a blank page when it is determined that the virtual address is valid.

In a first possible implementation manner of the first aspect, the method further includes: if the application for the blank page succeeds starting memory reading and writing; or if the application for the blank page fails, selecting a replacement page and providing the replacement page to an operating system so that the operating system replace.

With reference to the first aspect, or the first possible implementation manner of the first aspect, in a second possible implementation manner, the determining whether the virtual address is valid specifically includes: determining whether the virtual address falls within an allocated virtual address space, and if yes, determining that the virtual address is valid; or if not, finding whether the virtual address exists in a virtual memory address VMA space, and if yes, determining that the virtual address is valid.

With reference to the first aspect, or the first possible implementation manner or the second possible implementation manner of the first aspect, in a third possible implementation manner, before the applying for a blank page, the method further includes: counting a frequency of use of each cached blank page in a preset period; and selecting a blank page having a lowest frequency of use in the preset period when applying for the blank page.

With reference to the first possible implementation manner of the first aspect, in a fourth possible implementation manner, after the application for the blank page succeeds, the method further includes: updating the page table so that the page table includes the virtual address carried in the fetch request, and saving the page table to the TLB.

With reference to any one of the first aspect, or the first to the fourth possible implementation manners of the first aspect, in a fifth possible implementation manner, if it is found that the page table includes the virtual address carried in the fetch request, before the step of obtaining a physical address corresponding to the virtual address, the method further includes: saving the page table to the TLB.

According to a second aspect, embodiments of the present invention provide a memory management device, where the memory management device is located in a memory controller. The memory management device includes a translation look-aside buffer (TLB), a memory management unit (MMU) and a microcontroller. The TLB is configured to: receive a fetch request sent by a processor, where the fetch request carries a virtual address, and find whether the TLB caches a page table corresponding to the virtual address carried in the fetch request; and if yes, obtain a physical address corresponding to the virtual address from the page table, where the page table includes a correspondence between virtual addresses and physical addresses. The MMU is configured to: when the TLB does not cache a page table corresponding to the virtual address carried in the fetch request, obtain a base address field of the page table and search for the page table, and if the page table includes the virtual address, obtain a physical address corresponding to the virtual address. The microcontroller is configured to: when the page table does not include the virtual address, determine whether the virtual address is valid, and when it is determined that the virtual address is valid, apply for a blank page.

In a first possible implementation manner of the second aspect, the microcontroller is further configured to: when the application for the blank page succeeds, start memory reading and writing, and when the application for the blank page fails, select a replacement page and provide the replacement page to an operating system, so that the operating system replaces a page.

With reference to the second aspect, or the first possible implementation manner of the second aspect, in a second possible implementation manner, the microcontroller is further configured to: determine whether the virtual address falls within an allocated virtual address space, and if yes, determine that the virtual address is valid; or if not, find whether the virtual address exists in a virtual memory address VMA space, and if yes, determine that the virtual address is valid.

With reference to the second aspect, or the first possible implementation manner or the second possible implementation manner of the second aspect, in a third possible implementation manner, the microcontroller is further configured to: receive the fetch request, obtain a base address field of a page table of a process corresponding to the virtual address carried in the fetch request, and send the base address field to the MMU, so that the MMU searches for the page table according to the base address field.

With reference to any one of the second aspect, or the first to the third possible implementation manners of the second aspect, in a fourth possible implementation manner, the microcontroller is further configured to: count a frequency of use of each cached blank page in a preset period, and select a blank page having a lowest frequency of use in the preset period when applying for the blank page.

According to a third aspect, the present invention provides a memory controller, including: any memory management device according to the second aspect.

It can be learned from the foregoing technical solutions that the embodiments of the present invention have the following advantages.

In the technical solutions of the present invention, a memory is managed by a storage management device, so that load on an operating system can be reduced. When the storage management device determines that a page table does not include a virtual address carried in a fetch request, the storage management device does not trigger an interrupt of an operating system, but instead the memory management device manages the memory, and when determining that the virtual address is valid, applies for a blank page. The memory management device is located in a memory controller and is closer to a physical memory, so that memory management efficiency can be effectively improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons skilled in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

First, a memory management method provided in an embodiment of the present invention may be applied to a communications system. The memory management method may be applied to a memory management device, and the memory management device is located in a memory controller.

Figure 1:
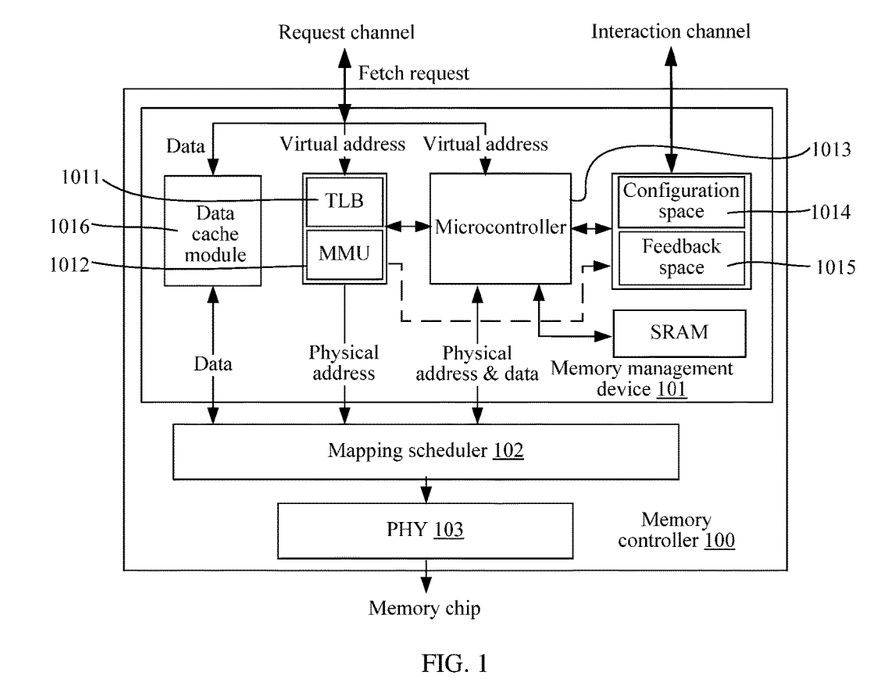
FIG. 1 is a schematic diagram of an architecture to which an embodiment of the present invention is applicable.

For details, refer to FIG. 1. FIG. 1 is a schematic diagram of an architecture to which an embodiment of the present invention is applicable. A memory controller 100 provided in the present invention may include a memory management device 101, a mapping scheduler 102, and a physical layer protocol PHY103. The mapping scheduler 102 is mainly responsible for functions such as address mapping (for example, translating a linear address to a rank, a bank, a row, and a column, or the like of a dynamic random access memory), requesting for scheduling, and refreshing control. The PHY103 is responsible for establishing a physical link between the memory controller 100 and a memory chip. For specific implementation of the mapping scheduler 102 and the PHY103, refer to the prior art, and details are not described herein.

When a cached resource requested by a processor is not hit, a fetch request may be sent to the memory controller 100 through a request channel to access a memory. The memory is mainly managed by the memory management device 101 in the memory controller 100 according to the buffer request.

A memory management method is applied to the memory management device 101. The memory management device 101 is located in the memory controller 100. The method includes: receiving a fetch request sent by a processor, where the fetch request carries a virtual address; finding whether a translation look-aside buffer (TLB) caches a page table corresponding to the virtual address carried in the fetch request; and if yes, obtaining a physical address corresponding to the virtual address from the page table; or if not, obtaining a base address field of the page table and searching for the page table, and if the page table includes the virtual address carried in the fetch request, obtaining a physical address corresponding to the virtual address, where the page table includes a correspondence between virtual addresses and physical addresses, and the TLB is located in the memory management device; and if the page table does not include the virtual address carried in the fetch request, determining whether the virtual address is valid, and applying for a blank page when it is determined that the virtual address is valid.

Figure 2:
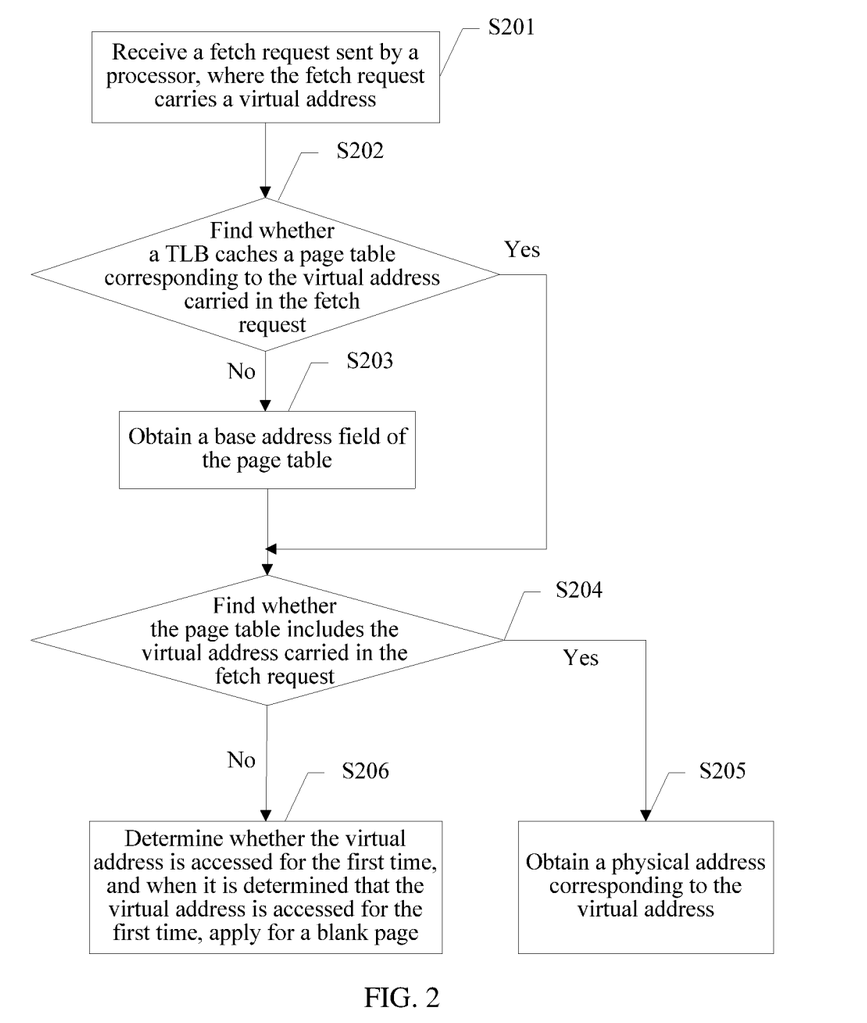
FIG. 2 is a schematic flowchart of a memory management method according to an embodiment of the present invention.

Referring to FIG. 2, FIG. 2 is a schematic flowchart of a memory management method according to an embodiment of the present invention. The method may include the following steps.

Step S201: Receive a fetch request sent by a processor, where the fetch request carries a virtual address.

When a cached resource requested by a processor is not hit, a fetch request may be sent to the memory management device 101 in the memory controller 100 through a request channel to access a memory. The fetch request carries the virtual address. A translation look-aside buffer (TLB) and a microcontroller in the memory management device 101 can receive the fetch request sent by the processor. The TLB is mainly responsible for fast address translation and searching for a page table, and the microcontroller is mainly responsible for managing a memory (including checking validity of the fetch request and so on). That is, the microcontroller needs to perform an operation such as memory management only when the TLB does not cache a relevant page table.

A computer system as an example to describe the present invention, the processor may be a CPU core.

Step S202: Find whether the translation look-aside buffer TLB caches a page table corresponding to the virtual address carried in the fetch request; and if not, step S203 is executed; or if yes, step S205 is executed, where the page table includes a correspondence between virtual addresses and physical addresses.

The page table is usually stored in a primary storage, and the page table stores the correspondence between the virtual addresses and the physical addresses. The TLB can cache a page table file. Therefore, if the TLB caches the TLB, the physical address corresponding to the virtual address may be directly obtained from the TLB; and if the TLB does not cache the page table, the page table may be searched for by using a memory management unit (MMU) in the memory management device 101.

Step S203: If the TLB does not cache the page table corresponding to the virtual address carried in the fetch request, obtain a base address field of the page table.

Because the page table is usually stored in the primary storage, the MMU may fail to obtain the base address field of the page table and therefore cannot directly search for the page table. In this case, the base address field of this page table may be provided by the microcontroller to the MMU, where a portal address of the page table portal address=the base address field+several highest bits of the virtual address.

Specifically, before the MMU searches for the page table and after the microcontroller receives a cache request, the base address field of the page table of a process corresponding to the virtual address carried in the fetch request may be obtained, and the base address field of the page table is provided to the MMU, so that the MMU searches for the page table according to the base address field of the page table. In an implementation manner, the microcontroller may search a process table to obtain the base address field of the page table of the process corresponding to the virtual address, and send the base address field of the page table to the MMU.

Step S204: Search for the page table according to the base address field of the page table, if it is found that the page table includes the virtual address carried in the fetch request, execute step S205, or if not, execute step S206.

If the page table includes the virtual address carried in the fetch request, step S205 is executed, and after the physical address corresponding to the virtual address is obtained, memory data may be read according to the physical address. If the page table does not include the virtual address carried in the fetch request, step S206 is executed.

Step S205: Obtain the physical address corresponding to the virtual address carried in the fetch request.

In step S202, if it is found that the translation look-aside buffer TLB caches the page table corresponding to the virtual address carried in the fetch request, the physical address corresponding to the virtual address is obtained from the page table by the TLB in step S205; and if the MMU finds that the page table includes the virtual address carried in the fetch request in step S204, the physical address corresponding to the virtual address carried in the fetch request is obtained by the MMU in step S205.

Step S206: If it is found that the page table does not include the virtual address carried in the fetch request, determine whether the virtual address is valid and apply for a blank page when it is determined that the virtual address is valid.

If the TLB does not cache the page table, and the page table in the MMU is not hit, the microcontroller can determine whether the virtual address carried in the fetch request is valid. The determining whether the virtual address carried in the fetch request is valid specifically includes: determining whether the virtual address falls within an allocated virtual address space, and if yes, determining that the virtual address is accessed for the first time and that the virtual address is valid; or if not, finding whether the virtual address exists in a virtual memory address (VMA) space, and if yes, determining that the virtual address is valid.

After determining that the virtual address exists in the VMA space, a page fault may be fed back to an operating system, and the microcontroller applies for the blank page.

If the virtual address is valid, the microcontroller applies for the blank page, and if the application for the blank page succeeds, memory reading and writing can be started directly; if the application for the blank page fails, a replacement page is selected, and the replacement page is provided to the operating system, and data is written by the operating system to a hard disk from the memory. If a replaced page is "clean", the operating system can directly use the replaced page after modifying a page table entry of the replaced page; or if the replaced page is "dirty", the operating system needs to first write the "dirty" page to a magnetic disk, generate a context switch, and suspend this process until the operation of the magnetic disk ends; and then pop a status before the page fault occurs from a stack. From then on, the process enters ready mode, and can be scheduled for execution by the operating system at any time.

In addition, after the application for the blank page succeeds, the method may further include: determining whether the applied blank page is validly accessed for the first time; and if yes, the operation of memory reading and writing can be started directly, or if not, a feedback is sent to the operating system to indicate that the blank page is ready, so that the operating system in the processor writes the data from the hard disk to the memory.

If it is found that in step S206 that the virtual address does not exist in the VMA space, the virtual address is determined as invalid, that is, the fetch request is determined as invalid access, a fault is fed back to the operating system, and the operating system executes the following step.

As can be learned from the above, in the technical solutions of the present invention, when a storage management device determines that a page table does not include a virtual address carried in a fetch request, the storage management device does not trigger an interrupt of an operating system, but instead the memory management device manages a memory, and when determining that the virtual address is valid, applies for a blank page. The memory management device is located in the memory controller and is closer to a physical memory, so that memory management efficiency can be effectively improved.

Figure 3A:
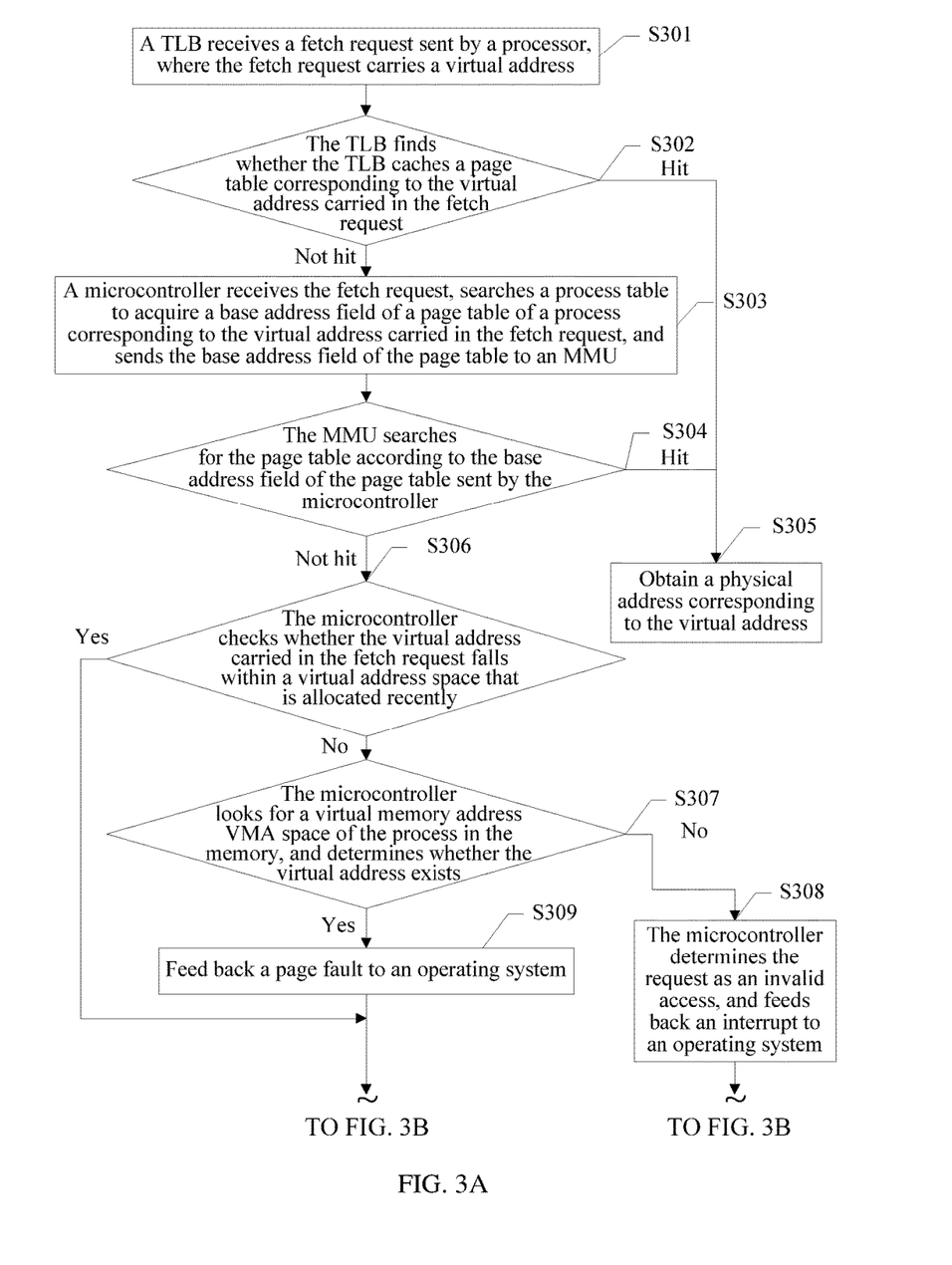
FIG. 3A and FIG. 3B are another schematic flowchart of a memory management method according to an embodiment of the present invention.
Figure 3B:
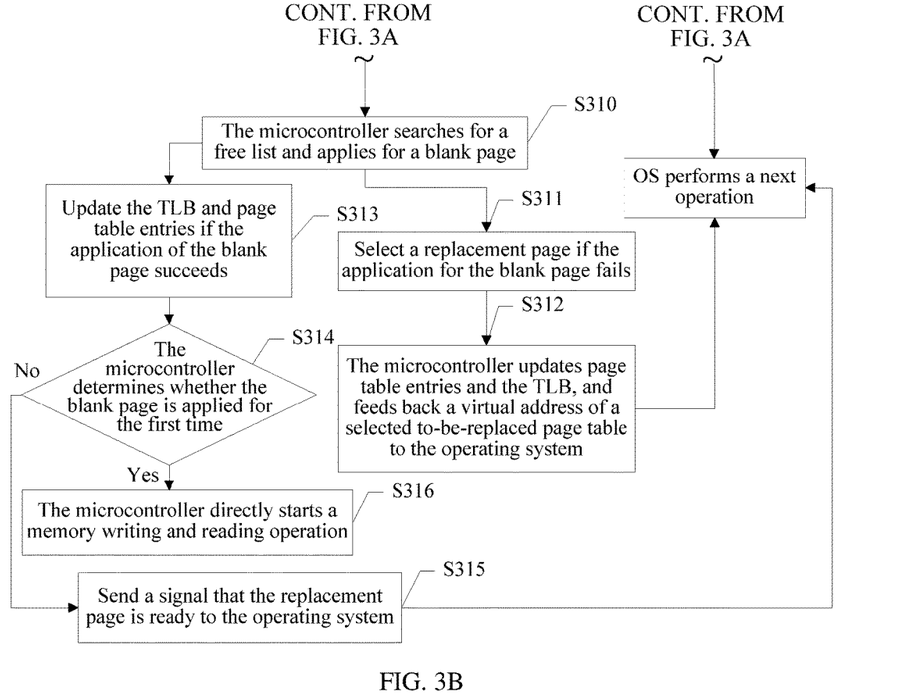

To better understand the foregoing solution, an embodiment of the present invention will be described in detail by using a specific implementation example. For details, refer to FIG. 3A and FIG. 3B. FIG. 3A and FIG. 3B are another schematic flowchart of a memory management method according to this embodiment of the present invention.

Step S301: A TLB receives a fetch request sent by a processor, where the fetch request carries a virtual address.

Step S302: The TLB finds whether the TLB caches a page table corresponding to the virtual address carried in the fetch request; and if not, execute step S303; or if yes, execute step S305.

Step S303: A microcontroller receives the fetch request sent by the processor, where the fetch request carries the virtual address, and the microcontroller searches a process table to obtain a base address field of a page table of a process corresponding to the virtual address, and sends the base address field of the page table to the MMU; and execute step S304.

The process table is a data structure table that is maintained locally by a memory management processor core and that may be stored in an on-chip SRAM, and the process table may specifically include table entries such as: a process ID, a processor core ID, a physical space quota and a management policy. The table entries are transmitted to a memory controller by using an interaction channel during process switching, a portal base address of the page table is created and maintained by the memory management processor, and the process table is invisible to the operating system. For details of the specific implementation manner, refer to Table 1:

TABLE

| Process ID | Processor core ID | Portal base address of the page table | Physical space quota | Management policy |
|---|---|---|---|---|
| Process ID | Processor core ID | Portal base address of the page table | Physical space quota | Management policy |
| Process ID | Processor core ID | Portal base address of the page table | Physical space quota | Management policy |

The microcontroller receives the fetch request sent by the processor, where the buffer request may carry a process ID, and the microcontroller may find a location of the page table corresponding to the process according to the process ID, obtain the base address field of the page table and provide the base address field to the MMU, so that the MMU can search for the page table according to the virtual address carried in the fetch request.

It can be understood that there is no chronological relationship between step S301 and step S303, and the microcontroller and the TLB may receive the fetch request sent by the processor at the same time.

Step S304: The MMU searches for the page table according to the base address field of the page table sent by the microcontroller. If the page table is hit, execute step S305, or if the page table is not hit, execute step S306.

The MMU searches for the page table according to the base address field of the page table sent by the microcontroller, and if the page table is hit, it indicates that the page table includes the virtual address carried in the fetch request, so a physical address corresponding to the virtual address can be obtained.

Step S305: Obtain the physical address corresponding to the virtual address.

If the process proceeds from step S302 to step S305, the physical address corresponding to the virtual address is obtained by the TLB, and memory data may be accessed by using the physical address; and if the process proceeds from step S304 to step S305, the physical address corresponding to the virtual address is obtained by the MMU, and the memory data may be accessed by using the physical address.

Step S306: The microcontroller checks whether the virtual address carried in the fetch request falls within a virtual address space that is allocated recently; and if not, execute step S307; or if yes, the microcontroller determines that the virtual address is valid, and execute step S310.

For example, a memory allocation table may be integrated in the memory controller, content recorded in table entries of the memory allocation table may include: a process ID, a virtual address of a process Malloc and a size of the virtual address. The information is transmitted by the operating system to the memory controller by using an interactive interface when a process calls a Malloc function.

When neither the TLB nor the MMU is hit, the microcontroller searches for the memory allocation table. Moreover, the microcontroller can search for the memory allocation table after receiving the fetch request, that is, during the processing of the TLB and the MMU, the microcontroller performs processing at the same time. When neither the TLB nor the MMU is hit, but the memory allocation table is hit, it indicates that the fetch request is valid and is accessed for the first time, and has not yet been allocated a page. The microcontroller can directly apply for a blank page to use for the request.

If none of the TLB, the MMU and the memory allocation table is hit, step S307 is executed, and the microcontroller needs to check the VMA space of the process in the memory, thereby further determining a reason why the MMU is not hit.

In this case, few resources are occupied, logic is simple and determining can be made quickly. After Malloc entries increase, the memory allocation table can implement a certain replacement policy, for example, the simplest first in first out (FIFO) policy.

Step S307: The microcontroller looks for a virtual memory address VMA space of the process in the memory, and determines whether the virtual address exists; if yes, execute step S309; or if not, execute step S308.

Step S308: The microcontroller determines the request as an invalid access, and feeds back an interrupt to the operating system.

A next operation is executed by the operating system, and the process ends.

Step S309: The microcontroller determines whether virtual address data of the request is in a SWAP partition or a file, and feeds back a page fault to the operating system; and execute step S310.

Step S310: The microcontroller searches for a free list and applies for a blank page; and if the application fails, the process proceeds to step S311; or if the application succeeds, the process proceeds to step S313.

Step S311: The microcontroller runs a page replacement algorithm to select a page and replace the page in the memory.

Step S312: The microcontroller updates page table entries and the TLB, and writes an address of the selected to-be-replaced page to a register of a feedback space, and feeds back a signal indicating that the replacement page is ready to the operating system.

If the replacement page is selected, a page table entry needs to be constructed for the new page, and the microcontroller needs to update the page table and the TLB.

After the microcontroller feeds back a signal to the operating system that the replacement page is ready, a next operation is executed by the operating system, and the process ends.

Step S313: The microcontroller updates the TLB and the page table entries.

If the application for the blank page succeeds, the page table entry needs to be constructed for the new page, and the microcontroller needs to update the page table and the TLB.

Step S314: The microcontroller determines whether the blank page is applied for the first time; if the fetch request is not a first valid access, the process proceeds to step S315; or if yes, execute step S316.

Step S315: The microcontroller writes a register value to the feedback space, and sends the signal that the replacement page is ready to the operating system.

The operating system determines a next operation after reading various information of the feedback space.

Step S316: The microcontroller directly starts a memory writing and reading operation.

As can be learned from the above, in the technical solution of the present invention, when an operating system needs to modify or search for a page table, the operating system only needs to send an instruction to a microcontroller, and the microcontroller can find a location of the page table in a memory according to a process ID, and automatically perform a corresponding operation. Because the memory is managed by the memory management device, load on the operating system can be reduced and memory management efficiency can be effectively improved.

To better implement the memory management method provided in the embodiments of the present invention, an embodiment of the present invention further provides a device based on the foregoing memory management method. Meanings of terms are the same as those in the foregoing memory management, and for details of implementation, refer to the description in the method embodiments.

Figure 4:
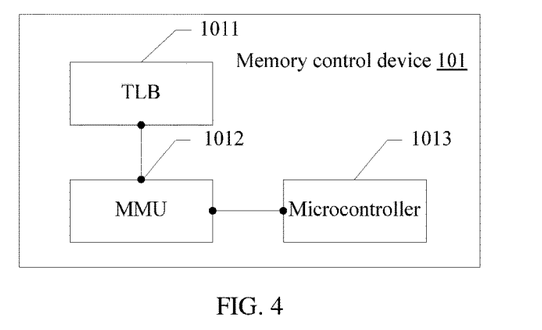
FIG. 4 is a schematic structural diagram of a memory management device according to an embodiment of the present invention.

A memory management device 101 is located in a memory controller. The memory management device 101 specifically includes a translation look-aside buffer TLB 1011, a memory management unit MMU 1012 and a microcontroller 1013. Referring to FIG. 4, FIG. 4 is a schematic structural diagram of a memory management device.

The TLB 1011 is configured to: receive a fetch request sent by a processor, where the fetch request carries a virtual address, and find whether the TLB caches a page table corresponding to the virtual address carried in the fetch request; and if yes, obtain a physical address corresponding to the virtual address from the page table, where the page table includes a correspondence between virtual addresses and physical addresses.

The MMU 1012 is configured to: when the TLB does not cache the page table corresponding to the virtual address carried in the fetch request, obtain a base address field of the page table and search for the page table, and if the page table includes the virtual address, obtain a physical address corresponding to the virtual address; and The microcontroller 1013 is configured to: when the page table does not include the virtual address, determine whether the virtual address is valid, and when it is determined that the virtual address is valid, apply for a blank page.

In an embodiment, the microcontroller 1013 is further configured to: when the application for the blank page fails, select a replacement page and provide the replacement page to an operating system, so that the operating system replaces a page.

In an embodiment, the microcontroller 1013 is specifically configured to: determine whether the virtual address falls within an allocated virtual address space; and if yes, determine that the virtual address is valid, or if not, find whether the virtual address exists in a virtual memory address VMA space, and if yes, determine that the virtual address is valid.

In an embodiment, the microcontroller 1013 is further configured to: receive the fetch request, and obtain a base address field of a page table of a process corresponding to the virtual address carried in the fetch request, and send the base address field to the MMU, so that the MMU searches for the page table according to the base address field.

In an embodiment, the microcontroller 1013 is further configured to: count a frequency of use of each cached blank page in a preset period, and select a blank page having a lowest frequency of use in the preset period when applying for the blank page.

Moreover, the memory management device 101 may further include: a configuration space 1014 and a feedback space 1015, where the configuration space and the feedback space are spaces for direct information exchange between the operating system and the memory controller. For example, the configuration space and the feedback space may be implemented as a pile of addressable registers. The operating system can send information to the configuration space through an interaction channel, and may obtain information from the feedback space. The microcontroller can directly read information from the configuration space, and can write information to the feedback space.

Moreover, the memory management device 101 may further include: a data cache module 1016, configured to cache two-way data of reading and writing.

In an implementation manner, code of the microcontroller may run in an on-chip SRAM.

Both the TLB and the MMU in this embodiment of the present invention are located in the memory controller and are closer to a physical memory, facilitating memory management by hardware.

As can be learned from the above, in this embodiment of the present invention, a memory is managed by a storage management device, so that load on an operating system can be reduced. When the storage management device determines that a page table does not include a virtual address carried in a fetch request, the storage management device does not trigger an interrupt of an operating system, but instead the memory management device manages the memory, and when determining that the virtual address is valid, applies for a blank page. The memory management device is located in a memory controller and is closer to a physical memory, so that memory management efficiency can be effectively improved.

Embodiments of the present invention further provide a memory controller. For details, refer to FIG. 1. The memory controller may include any memory management device described above, and the memory management device may include: a translation look-aside buffer TLB, a memory management unit MMU and a microcontroller. For specific implementation, refer to the foregoing embodiments and details will not be described herein again.

The memory controller in this embodiment may be integrated in a CPU, or may be an independent chip.

In the foregoing embodiments, the description of each embodiment has respective focuses. For a part that is not described in detail in an embodiment, refer to related descriptions in other embodiments.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

Functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

The memory management method and device and the memory controller provided in the embodiments of the present invention are described in detail above, and the principle and implementation manners of the present invention are described herein through specific examples. The foregoing description about the embodiments is merely provided to help understand the method and core ideas of the present invention. In addition, persons of ordinary skill in the art can make modifications to the specific implementation manners and application scopes according to the ideas of the present invention. In conclusion, the content of the specification should not be construed as a limit to the present invention.

What is claimed is:

1. A method, wherein the method is applied to a memory management device that is located in a memory controller, and the method comprises:
   receiving a fetch request sent by a processor, wherein the fetch request carries a virtual address;
   determining whether a translation look-aside buffer (TLB) located in the memory management device caches a page table corresponding to the virtual address carried in the fetch request;
   when the TLB caches a page table corresponding to the virtual address carried in the fetch request, obtaining a physical address corresponding to the virtual address from the page table, wherein the page table comprises a correspondence between virtual addresses and physical addresses; and
   when the TLB does not buffer a page table corresponding to the virtual address carried in the fetch request, performing the following:
      obtaining a base address field of a page table of a process corresponding to the virtual address, and searching for the page table of the process corresponding to the virtual address according to the base address field of the page table of the process corresponding to the virtual address;
      when the page table of the process corresponding to the virtual address comprises the virtual address carried in the fetch request, obtaining a physical address corresponding to the virtual address; and
      when the page table of the process corresponding to the virtual address does not comprise the virtual address carried in the fetch request, determining whether the virtual address is valid, and applying for a blank page when it is determined that the virtual address is valid.

2. The method according to claim 1, further comprising:
   when the application for the blank page succeeds, starting memory reading and writing; and
   when the application for the blank page fails, selecting a replacement page and providing the replacement page to an operating system so that the operating system replaces a page.

3. The method according to claim 2, wherein after the application for the blank page succeeds, the method further comprises:
   updating the page table of the process corresponding to the virtual address so that the page table of the process corresponding to the virtual address comprises the virtual address carried in the fetch request, and saving the page table of the process corresponding to the virtual address to the TLB.

4. The method according to claim 1, wherein determining whether the virtual address is valid comprises:
   determining whether the virtual address falls within an allocated virtual address space;
   when the virtual address falls within the allocated virtual address space, determining that the virtual address is valid; and
   when the virtual address does not fall within the allocated virtual space, finding whether the virtual address exists in a virtual memory address (VMA) space, and if the virtual address exists in the VMA space, determining that the virtual address is valid.

5. The method according to claim 1, wherein before applying for the blank page, the method further comprises:
   counting a frequency of use of each cached blank page in a preset period; and
   selecting a blank page having a lowest frequency of use in the preset period when applying for the blank page.

6. The method according to claim 1, wherein it is found that the page table of the process corresponding to the virtual address comprises the virtual address carried in the fetch request, and before obtaining the physical address corresponding to the virtual address, the method further comprises:
   saving the page table of the process corresponding to the virtual address to the TLB.

7. A device, wherein the device is located in a memory controller, and the device comprises:
   a translation look-aside buffer (TLB);
   a memory management unit (MMU); and
   a microcontroller;
   wherein the TLB is configured to:
      receive a fetch request sent by a processor, wherein the fetch request carries a virtual address, and determine whether the TLB caches a page table corresponding to the virtual address carried in the fetch request; and
      when the TLB caches a page table corresponding to the virtual address carried in the fetch request, obtain a physical address corresponding to the virtual address from the page table, wherein the page table comprises a correspondence between virtual addresses and physical addresses;
   wherein the MMU is configured to:
      when the TLB does not cache a page table corresponding to the virtual address carried in the fetch request, obtain a base address field of a page table of a process corresponding to the virtual address and search for the page table of the process corresponding to the virtual address according to the base address field of the page table of the process corresponding to the virtual address; and when the page table of the process corresponding to the virtual address comprises the virtual address, obtain a physical address corresponding to the virtual address; and wherein the microcontroller is configured to:

when the page table of the process corresponding to the virtual address does not comprise the virtual address, determine whether the virtual address is valid, and when it is determined that the virtual address is valid, apply for a blank page.

8. The device according to claim 7, wherein the microcontroller is further configured to:

when the application for the blank page succeeds, start memory reading and writing; and when the application for the blank page fails, select a replacement page and provide the replacement page to an operating system, so that the operating system replaces a page.

9. The device according to claim 7, wherein the microcontroller is further configured to:

determine whether the virtual address falls within an allocated virtual address space;

when the virtual address falls within an allocated virtual address space, determine that the virtual address is valid; or when the virtual address does not fall within an allocated virtual address space, find whether the virtual address exists in a virtual memory address (VMA) space, and when the virtual address exists in the VMA space, determine that the virtual address is valid.

10. The device according to claim 7, wherein the microcontroller is further configured to:

receive the fetch request;

obtain the base address field of the page table of the process corresponding to the virtual address carried in the fetch request; and send the base address field of the page table of the process corresponding to the virtual address to the MMU, so that the MMU searches for the page table of the process corresponding to the virtual address according to the base address field of the page table of the process corresponding to the virtual address.

11. The device according to claim 7, wherein the microcontroller is further configured to: count a frequency of use of each cached blank page in a preset period, and select a blank page having a lowest frequency of use in the preset period when applying for the blank page.

12. A memory controller, comprising the device according to claim 7.

* * * * *